Patented Mar. 12, 1946

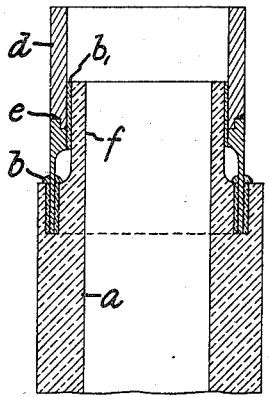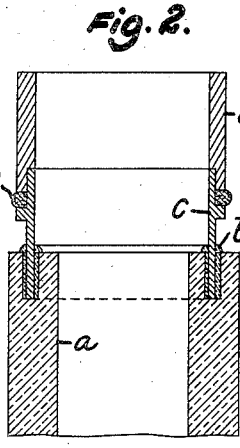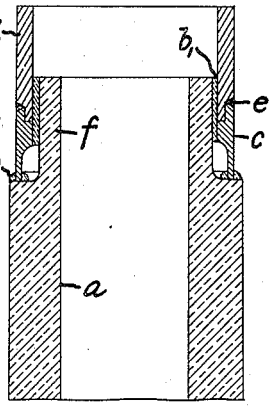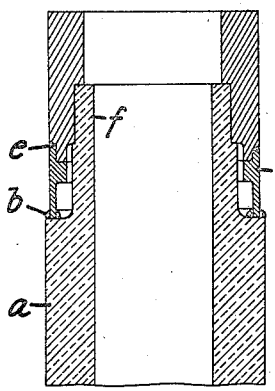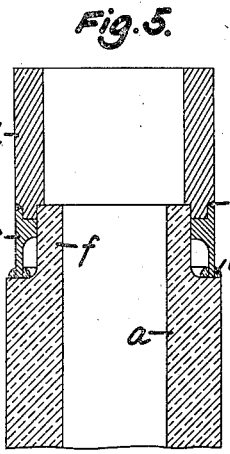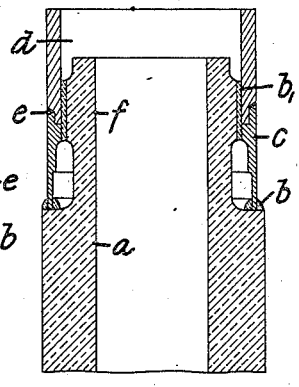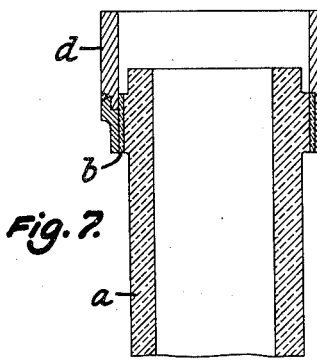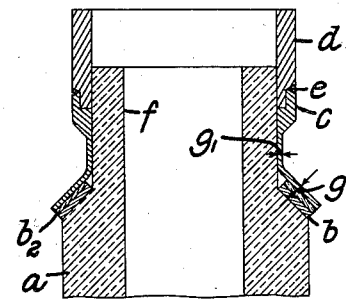

2,396,320

UNITED STATES PATENT OFFICE 2,396,320

JOINT BETWEEN METAL AND CERAMIC BODIES

Arthur Gaudenzi, Wettingen, and Rudolf Risch, Baden, Switzerland, assignors to Aktiengesellschaft Brown, Boveri & Cie, Baden, Switzerland, a joint-stock company Application February 28, 1942, Serial No. 432,854
In Switzerland February 14, 1941

13 Claims. (Cl. 285—111)

It is known to make vacuum-tight joints between soft or hard glass and metal, for instance between glass and copper or chrome iron. Furthermore it is also known to make joints between a metal body and a ceramic body by means of a glass or enamel flux, the glass flux possessing an expansion due to heat which is about equal to that of the ceramic body but is smaller than that of the metal body. When joints of this kind are used, for instance for the insulated bushings of electrodes in electrical rectifiers with vapour or gas discharge paths, it is essential that the joint be mechanically strong and also able to withstand high thermal stresses because the temperature at which the rectifier is operated can be as high as 400° C. Iron alloys which will satisfy these conditions are, however, difficult to obtain and very expensive. A more practical arrangement is to use chrome iron or copper for making a joint with a ceramic (porcelain) body by means of a glass or enamel flux. The use of copper for making a joint with porcelain is unsuitable for mercury vapour rectifiers because it amalgamates with the mercury. The substitution of chrome iron for copper introduces the likelihood of a rupture of the bond to the glass when the joint is subjected to a temperature of about 400° C., as is the case with rectifiers. As a result of the large difference in the coefficient of expansion of chrome iron and porcelain the former expands much more than the latter when the temperature rises. Although chrome iron has a high mechanical strength it has a low adhesion to a glass flux or enamel, and the joint separates along the junction of the metal and the glass flux.

The present invention thus deals with a joint between a metal body and a ceramic body where a glass or enamel flux is used which has an expansion due to heat approximating to that of the ceramic body but smaller than that of the metal body, and where the aforementioned disadvantages are overcome by inserting in the joint a soft metal which, with respect to the glass or enamel flux, has a higher intensity of adhesion and a higher flexibility than the metal body which is to be joined to the ceramic body.

Various constructional examples of the invention are illustrated diagrammatically in Figs. 1–8 of the accompanying drawing which shows a number of joints in longitudinal section.

In the several views, the reference character $a$ indicates a ceramic body, for instance porcelain, which has a tubular form and is to be joined to an iron tube $d$. An intermediate tubular element $c$ of soft metal is inserted into the joint and this element $c$ has a greater intensity of adhesion to the glass or enamel flux and a greater flexibility than the iron tube $d$. The intermediate element $c$ can for instance be a piece of copper tube. This copper tube $c$ is welded to the iron tube $d$ at the point $e$ and is preferably thinner at the end adjacent to the joint.

The copper tube $c$ can be connected to the porcelain tube $a$ in such a manner that the tapered end of the former fits into an annular groove in the porcelain body, as shown in Figs. 1 and 2, the gap between the copper tube and the ceramic body being filled with glass or porcelain flux $b$. In the embodiments of the invention shown in Figs. 3 to 6 the tapered end of the copper tube $c$ abuts on a recessed shoulder of the porcelain body where it is fixed in position by the glass or enamel flux $b$. Figs. 7 and 8 show embodiments where the copper tube $c$ is in the form of a sleeve which fits over the porcelain tube $a$ and is held in position by the glass or enamel flux $b$.

In order to protect the copper tube and the joint itself against the effects of mercury it is necessary to provide those parts to which the mercury has access with a protective covering. This covering can consist of glass or enamel or a galvanic layer of metal such as chrome, iron or nickel, which is not affected by mercury. A further possibility is to oxidize the surface of the parts in question. The same purpose is served by providing the porcelain tube with a sleeve portion $f$ which extends beyond the joint $e$ between the soft metal $c$ and the ferrous metal $a$, and contacts the iron tube $d$. In order to reduce still further the risk of any mercury reaching the copper $c$, the ceramic extension $f$ may be bonded to the metal $d$ by a glass or enamel flux $b_1$, as shown in Figs. 1, 3 and 6 or alternatively a joint as shown in Figs. 4 and 5 can be employed.

In Fig. 8 the tapered end of the copper tube $c$ has a conical flange which is fitted on to a conical shoulder of the porcelain tube. In order to obtain a good permanent joint it is expedient to make the transition from the normal tube section to the thinner tapered conical section a gradual one, as shown in the figure. The wall thickness of the conical part $g$ and the adjoining cylindrical section $g_1$ in the vicinity of the joint is preferably 0.1 to 0.5 mm. It is an advantage to provide the conical part $g$ and the adjoining cylindrical part $g_1$ with a covering of glaze or enamel $b_2$ before applying the glass flux. As shown in Fig. 7 it is also an advantage to make the porcelain tube $a$ thicker at the place where it is joined to the sleeve-like metal tube $d$.

Since the intensity of adhesion of copper to glass is very high and the yield point of copper is low, the use of this metal for the intermediate element in the joint possesses the advantage that the joint is not broken despite the high expansion of copper due to heat, because the copper adheres to the glass. Another metal can be used instead copper on condition that it possesses a high intensity of adhesion and elasticity when compared with the glass or enamel flux employed for the joint.

Instead of constructing the intermediate element $c$ to form the continuation of the metal tube $d$ as shown in the embodiments illustrated in the drawing, it is also possible to fit a layer of this metal on to the metal tube and to connect both together by mechanical means. This metal layer can also be produced and applied galvanically or by electrolysis. It is difficult to weld the copper tube to the iron tube because due to the higher coefficient of expansion of the former when compared with the latter, the copper tube attempts to free itself from the iron tube during welding. This can be avoided by employing a cylindrical joint whereby the ends of the tubes overlap so that the end of the copper tube is enclosed by the end of the iron tube. By this means it is possible to prevent the copper tube from leaving the iron tube due to unequal expansion. In order to form a suitable groove for the weld it is expedient to break the edges of the tube ends. Such a welding groove can also be formed by making the edge of the iron tube surrounding the copper tube shorter than that of the latter, as shown in Fig. 2. Instead of welding the copper and iron tubes it is also possible to braze them together or to combine both methods for connecting the tubes.

We claim:

1. The combination with a ceramic part and a ferrous metal part each having one surface exposed to the same atmosphere, of means including a member of relatively soft non-ferrous metal and a vitreous flux forming a joint between said parts; the flux having a coefficient of heat expansion approximating that of the ceramic part and less than that of the ferrous metal part, said soft metal member having a greater adhesion to the flux and higher flexibility than said ferrous metal part and said soft metal member being shielded from contact with said atmosphere.

2. The invention as recited in claim 1, wherein both said ferrous metal part and said soft metal member are bonded to said ceramic part by the vitreous flux.

3. The combination with a tubular ceramic part and a tubular ferrous metal part, of means including an annulus of copper and a vitreous flux forming a joint between said parts, said copper annulus being located outside of at least part of said tubular ceramic part and said joint-forming means including means shielding said annulus from the interior of said tubular ceramic part.

4. The invention as recited in claim 3, wherein said shield means comprises a coating of a protective material.

5. The invention as recited in claim 3, wherein said shielding means comprises a coating of vitreous enamel.

6. The invention as recited in claim 3, wherein said shielding means comprises a portion of said tubular ferrous metal part.

7. The invention as recited in claim 3, wherein the end of said tubular ceramic part extends beyond the copper annulus, and said extending end is bonded to the tubular ferrous metal part by a vitreous flux.

8. The invention as recited in claim 3, wherein the adjacent ends of the tubular ferrous metal part and the copper annulus are telescoped and mechanically united by a metallic binder.

9. The invention as recited in claim 3, wherein the adjacent ends of the tubular ferrous metal parts and the copper annulus are telescoped and mechanically united by a metallic binder and the other end of the copper annulus is bonded to the ceramic part by the vitreous flux.

10. The invention as recited in claim 3, wherein said copper annulus has an outwardly flaring conical portion of reduced thickness bonded to a complemental conical portion of the ceramic part by the vitreous flux.

11. The invention as recited in claim 3, wherein said copper annulus has a cylindrical end portion of reduced wall thickness extending into a groove in the ceramic part, and the vitreous flux bonds the end portion to the ceramic part.

12. The invention as recited in claim 3 wherein said copper annulus has a cylindrical end portion of reduced wall thickness connected to the ceramic part by means of a vitreous flux.

13. The invention as recited in claim 3 wherein the copper annulus comprises a first relatively thick walled end portion joined to said ferrous metal part by a metallic binder, a second end portion in the form of a conical flange joined to the ceramic part by a vitreous flux and an intermediate tubular portion of less wall thickness than said first end portion.

ARTHUR GAUDENZI.
RUDOLF RISCH.